(12) United States Patent
Bill et al.

(10) Patent No.: US 8,833,729 B2
(45) Date of Patent: Sep. 16, 2014

(54) PROPORTIONAL THROTTLE VALVE

(75) Inventors: Markus Bill, Heusweiler (DE); Peter Bruck, Althombach (DE); Markus Veit, Nonnweiler-Primstal (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/138,938

(22) PCT Filed: Feb. 25, 2010

(86) PCT No.: PCT/EP2010/001158
§ 371 (c)(1),
(2), (4) Date: Oct. 27, 2011

(87) PCT Pub. No.: WO2010/124757
PCT Pub. Date: Nov. 4, 2010

(65) Prior Publication Data
US 2012/0037830 A1    Feb. 16, 2012

(30) Foreign Application Priority Data

Apr. 30, 2009    (DE) .......................... 10 2009 019 554

(51) Int. Cl.
*F16K 31/02*    (2006.01)
*F16K 31/06*    (2006.01)
*G05D 7/06*    (2006.01)

(52) U.S. Cl.
CPC .......... *F16K 31/0668* (2013.01); *G05D 7/0635* (2013.01)
USPC .......................... 251/129.08; 251/77; 251/117

(58) Field of Classification Search
USPC ................ 137/504, 490; 251/129.08, 129.15, 251/30.03–30.04, 128.08, 63.4, 77, 117, 251/344, 347, 348
See application file for complete search history.

(56) References Cited

U.S. PATENT DOCUMENTS

| 2,916,048 | A | * | 12/1959 | Gunkel | 137/544 |
| 3,015,341 | A | * | 1/1962 | Hedlend et al. | 137/493 |
| 3,145,730 | A | * | 8/1964 | Presnell | 137/493.2 |
| 3,250,293 | A | * | 5/1966 | Adams et al. | 137/528 |
| 3,752,182 | A |   | 8/1973 | Brand |  |
| 3,788,597 | A | * | 1/1974 | Ichioka | 251/129.08 |
| 3,972,345 | A | * | 8/1976 | Court | 137/490 |
| 4,305,566 | A | * | 12/1981 | Grawunde | 251/30.02 |
| 4,553,732 | A | * | 11/1985 | Brundage et al. | 251/30.01 |
| 4,716,927 | A | * | 1/1988 | Vayra | 137/490 |

(Continued)

FOREIGN PATENT DOCUMENTS

| DE | 297 13 293 | 10/1997 |
| DE | 103 23 595 | 12/2004 |
| EP | 1 167 847 | 1/2002 |
| EP | 1 316 750 | 6/2003 |

*Primary Examiner* — John K Fristoe, Jr.
*Assistant Examiner* — Matthew W Jellett
(74) *Attorney, Agent, or Firm* — Roylance, Abrams, Berdo & Goodman, LLP

(57) ABSTRACT

A proportional throttle valve includes a valve piston (2) functioning as a variable orifice and displaceably guided in the longitudinal direction in a valve housing (3) having a fluid inlet (4) and a fluid outlet (5). Since a leading edge (6) of the valve piston (2) is formed by a control piston (7) of a flow regulator (8) for the fluid connection of the fluid inlet (4) and the fluid outlet (5), the flow control valve and the proportional throttle valve are functionally combined in one valve unit.

26 Claims, 1 Drawing Sheet

(56) References Cited

U.S. PATENT DOCUMENTS

| | | | |
|---|---|---|---|
| 4,848,721 A * | 7/1989 | Chudakov | 251/30.02 |
| 5,529,387 A * | 6/1996 | Mialkowski | 251/30.03 |
| 6,021,996 A * | 2/2000 | Nakayoshi | 251/30.02 |
| 6,073,652 A * | 6/2000 | Wilke et al. | 137/596.16 |
| 6,824,120 B2 * | 11/2004 | Furuta et al. | 251/355 |
| 7,007,925 B2 * | 3/2006 | Nordstrom et al. | 251/129.15 |
| 2004/0244838 A1 * | 12/2004 | Stroud | 137/490 |
| 2006/0011878 A1 * | 1/2006 | Denyer et al. | 251/129.08 |
| 2006/0043323 A1 * | 3/2006 | Wang et al. | 251/30.01 |

* cited by examiner

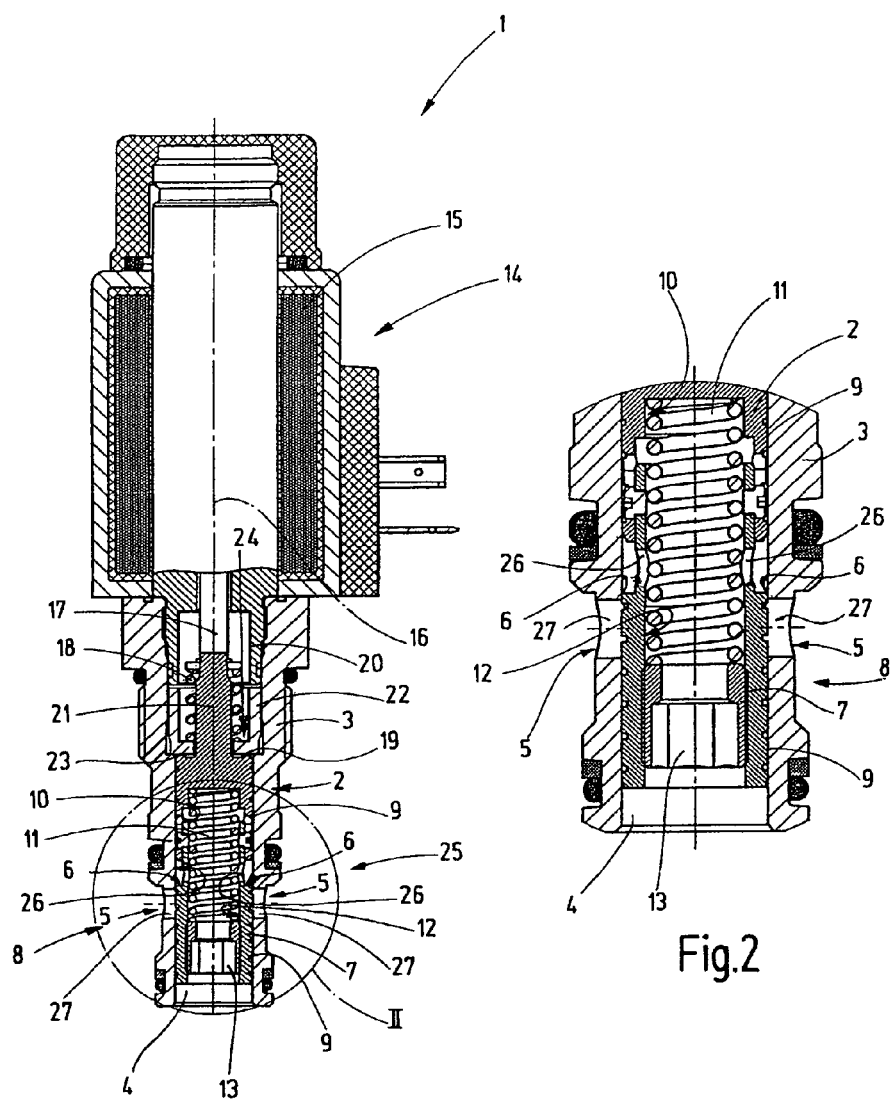

PROPORTIONAL THROTTLE VALVE

FIELD OF THE INVENTION

The invention relates to a proportional throttle valve comprising a valve piston providing an orifice function and movably guided in a valve housing with a fluid inlet and a fluid outlet in the longitudinal direction. The valve piston has a metering edge activating a fluid connection between the fluid inlet and the fluid outlet.

BACKGROUND OF THE INVENTION

Proportional throttle valves are often used when the level of the fluid flow passing through these valves is to be continuously changed, depending on an existing magnetic current of a coil activating the valve piston. The opening cross section of the valve seat of the valve piston is dependent on the position of the valve piston. If the coil is supplied with a direct electrical current, a magnetic force proportional to the magnetic current forms and moves the valve piston into an open position. In general a spring located on the back of the valve piston is tensioned generating a spring force counteracting the magnetic force. If an equilibrium is established between the magnetic force and spring force, the valve piston remains in its position.

The proportional throttle valve is largely independent of the pressure level to be controlled because the valve piston is pressure-equalized, i.e., a uniformly high pressure acts on the two end surfaces of the valve piston.

Proportional throttle valves are used, for example, in lifting-lowering applications, such as in industrial trucks. To lower the load for these applications, a 2/2-way directional valve is used for the basic lifting-lowering motion. At the same time, the proportional throttle valve is used for controlling the volumetric flow.

In proportional throttle valves, the problem is that the volumetric flow is dependent on the differential pressure between the fluid inlet and fluid outlet. For example, in industrial trucks or other lifting devices, the lowering speed depends on the load being moved. Boundary values could damage the lifting device or the load to be transported in the lowering process and can be exceeded. In the prior art, a non-adjustable maximum volumetric flow regulator is connected in series upstream of a proportional throttle valve. The maximum volumetric flow regulator is designed to be passive and engages only when the maximum lowering rate is exceeded. A hydraulic circuit set up in this respect according to the prior art is therefore complex and, due to the plurality of components, requires an installation space of corresponding large dimensions.

SUMMARY OF THE INVENTION

An object of the invention is to provide an improved proportional throttle valve which integrates the indicated additional functions of a flow control valve.

This object is basically achieved by a proportional throttle valve where a metering edge of the valve piston regulates the fluid connection between the fluid inlet and the fluid outlet and is formed by a control piston of a flow regulator. The functions of the flow control valve and of the proportional throttle valve are then combined in one valve unit.

In one especially preferred embodiment saving installation space, the control piston of the flow regulator is movably guided in the same bore of the valve housing as the valve piston itself. In this connection, especially advantageously the control piston of the flow regulator is guided in the manner of a cascade in an axial bore of the valve piston, and a required control spring is guided radially both in an axial bore of the control piston and in an axial bore of the valve piston.

A specified metering orifice of the flow regulator is preferably located on the axial end of the control piston adjacent to the fluid inlet, forming a seal in a bottom of the control piston, and forms a fluidic connection into the spring chamber of the control spring. The control piston has radial fluid outlets. In the rest state of the proportional throttle valve, the radial fluid outlets completely cover the axial bore for the valve piston. Only when the coil is energized to move the valve piston do the outlets partially or completely cover the radial bores of the valve housing forming the fluid outlet. The proportional throttle valve can be designed to be directly controlled or piloted.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale:

FIG. 1 is a side elevational view in section of a proportional throttle valve according to an exemplary embodiment of the invention;

FIG. 2 is an enlarged, partial side elevational view in section of area II of FIG. 1.

DETAILED DESCRIPTION OF THE DRAWINGS

FIG. 1 shows in a longitudinal section a directly controlled proportional throttle valve 1. A magnet system housing contains a magnet system 14 with an armature 16 (not detailed), actuatable by a DC coil 15. The magnet system 14 is preferably made as a pressing, displacement-controlled proportional magnet system. In the energized state of the DC coil 15, the armature 16 and an actuating member 17, dynamically connected to one another, are movable down in the direction of a fluid inlet 4.

The actuating member 17 is dynamically connected to a valve piston 2 made as an "orifice piston." In the de-energized state of the DC coil 15, the armature 16, the actuating element 17 and the valve piston 2 are moved by a spring 18 against a lift stop 19. This position corresponds to the closed state of the proportional throttle valve 1, the fluid passage between the fluid inlet 4 and fluid outlet 5 being blocked.

The magnet system housing is made with a cylindrical guide 20 projecting into a valve housing 3 and is sealed accordingly. The cylindrical actuating element 17 likewise projects into the cylindrical guide 20 and is detachably and positively connected in guide 20 to an extension 21 of the valve piston 2. Extension 21 guides the spring 18 like a mandrel, with permanent contact. The extension 21, after passage through a cylindrical spacer 22 with a bottom 23 defining the lift stop 19, undergoes transition into the valve piston 2 formed as an orifice piston. The lift stop 19 separates the back 24 of the valve piston 2 from its main control section 25.

The main control section 25 is divided in its more or less axial middle into a control piston 7 of a flow regulator 8. The control piston 7 is guided in the same bore 9 as the valve piston 2 and is supported to be able to move in the valve housing via the actuating element 17 as part of the main control section 25. The control piston 7 is guided to be able to move axially in an axial bore 10 of the valve piston 2. A control spring 11 is made as a compression spring and is guided in the axial bore 10 over approximately half its length.

The control piston 7 has an axial bore 12 used as a guide for the control spring 11. On its axial end facing the fluid inlet 4, a metering orifice 13 is inserted, in particular screwed, into the control piston 7. The control piston 7 has diametrically opposite radial openings 26 which, in the rest state of the proportional throttle valve 1 shown in FIG. 2, in the sealed position completely cover the wall of the bore 9. As FIG. 2 illustrates in its detail II according to FIG. 1, the fluid outlet 5 is formed by at least two openings 27 diametrically located in the wall of the bore 9. The metering edge 6 is located on the outside diameter of the control piston 7 and is used to regulate the entire volumetric flow between the fluid inlet 4 and fluid outlet 5 when the DC coil 15 is energized accordingly.

In the operation of the proportional throttle valve 1, the control spring 11 by its pretensioning keeps the distance between the metering orifice 13 and the upper part of the valve piston 2 at a maximum. This state lasts until a maximum possible volumetric flow is reached and the valve works solely as a proportional throttle valve. The metering orifice 13 causes a pressure loss when flow through it takes place, depending on the value of the volumetric flow. This pressure value in turn causes a positioning force in the direction to the control spring 11 until the main control section 25 is likewise shortened by shortening the control spring 11. The metering edge 6 is pushed in the direction of a smaller flow cross section on the fluid outlet 5. In moving in that manner, the pressure loss on the metering orifice 13 in turn drops somewhat until an equilibrium state is established for the volumetric flow. The valve piston 2 then assumes the compensator function and the proportional throttle function.

With the solution according to the invention, the flow regulation function of an external flow regulator can be accommodated directly in the proportional throttle valve. In this way within the hydraulic circuit a complete additional valve can be omitted. As described, this is achieved by the metering orifice and control spring which are necessary for a constant flow regulator being housed in the control piston of the proportional throttle valve. The compensator function, necessary for a flow regulator, is assumed by the control piston of the proportional throttle valve itself. The described metering edge of the piston then simultaneously assumes the proportional throttle function and the compensator function of the flow regulator.

While one embodiment has been chosen to illustrate the invention, it will be understood by those skilled in the art that various changes and modifications can be made therein without departing from the scope of the invention as defined in the appended claims.

What is claimed is:

1. A proportional throttle valve, comprising:
   a valve housing having a fluid inlet, a fluid outlet, a longitudinal bore defined by an inwardly and radially facing housing wall and a longitudinal axis;
   a valve piston enabling an orifice function and being movably guided and engaged by said housing wall in said valve housing for movement along said longitudinal axis; and
   a control piston of a flow regulator being located in said valve housing and forming a metering edge of said valve piston for connecting said fluid inlet to said fluid outlet, said control piston having a first portion movably guided in and engaging a radially facing wall of an axial bore in said valve piston and a second portion extending outside said axial bore and engaging said housing wall, said metering edge being adjacent a junction of said first and second portions.

2. A proportional throttle valve according to claim 1 wherein
   said bore also movably guides said control piston.

3. A proportional throttle valve according to claim 1 wherein
   a control spring is radially supported in said axial bore of said valve piston and in an axial bore in said control piston.

4. A proportional throttle valve according to claim 1 wherein
   said control piston comprises a metering orifice of said flow regulator.

5. A proportional throttle valve according to claim 4 wherein
   said metering orifice is located in an end region of said control piston facing said fluid inlet.

6. A proportional throttle valve according to claim 1 wherein
   said fluid inlet opens into said valve housing along said longitudinal axis; and
   said fluid outlet extends in said valve housing perpendicular to said longitudinal axis.

7. A proportional throttle valve according to claim 1 wherein
   said valve piston is directly controlled by a magnet system.

8. A proportional throttle valve according to claim 6 wherein
   said control piston comprises a control opening extending radially relative to said longitudinal axis, said metering edge being adjacent a periphery of said control opening.

9. A proportional throttle valve according to claim 8 wherein
   said valve piston comprises an end edge adjacent said control opening.

10. A proportional throttle valve according to claim 6 wherein
    said metering edge is movable adjacent and along said fluid outlet.

11. A proportional throttle valve according to claim 1 wherein
    said metering edge is movable adjacent and along said fluid outlet.

12. A proportional throttle valve according to claim 1 wherein
    said valve piston has an opening edge opposite and facing said metering edge, with said opening edge and said metering edge being movable adjacent and along said fluid outlet.

13. A proportional throttle valve according to claim 1 wherein
    said control piston comprises a radially extending control opening adjacent said metering edge, said metering edge extending radially relative to said longitudinal axis.

14. A proportional throttle valve according to claim 1 wherein
    said metering edge extends radially on said control piston relative to said longitudinal axis adjacent said fluid outlet.

15. A proportional throttle valve, comprising:
    a valve housing having a fluid inlet, a fluid outlet and a longitudinal axis, said fluid inlet opening into said valve housing along said longitudinal axis, said fluid outlet extending in said valve housing perpendicular to said longitudinal axis;

a valve piston enabling an orifice function and being movably guided in said valve housing along said longitudinal axis; and a control piston of a flow regulator being located in said valve housing and forming a metering edge of said valve piston for connecting said fluid inlet to said fluid outlet, said control piston being movably guided in said valve piston along said longitudinal axis and comprises a control opening extending radially relative to said longitudinal axis, said metering edge being adjacent a periphery of said control opening.

16. A proportional throttle valve according to claim 15 wherein said valve housing has a bore receiving and movably guiding said valve piston; and said bore also movably guiding said control piston.

17. A proportional throttle valve according to claim 15 wherein said control piston is movably guided in an axial bore of said valve piston; and a control spring is radially supported in said axial bore of said valve piston and in an axial bore in said control piston.

18. A proportional throttle valve according to claim 15 wherein said control piston comprises a metering orifice of said flow regulator.

19. A proportional throttle valve according to claim 18 wherein said metering orifice is located in an end region of said control piston facing said fluid inlet.

20. A proportional throttle valve according to claim 15 wherein said valve piston is directly controlled by a magnet system.

21. A proportional throttle valve according to claim 15 wherein said valve piston comprises an end edge adjacent said control opening.

22. A proportional throttle valve according to claim 15 wherein said metering edge is movable adjacent and along said fluid outlet.

23. A proportional throttle valve according to claim 15 wherein said valve piston has an opening edge opposite and facing said metering edge, with said opening edge and said metering edge being movable adjacent and along said fluid outlet.

24. A proportional throttle valve according to claim 15 wherein said valve housing comprises a longitudinal bore defined by an inwardly and radially facing housing wall, said valve piston and said control piston engaging and being guided for axial movement by said housing wall.

25. A proportional throttle valve according to claim 15 wherein said housing comprises a longitudinal bore defined by an inwardly and radially facing housing wall engaged by and guiding said valve piston for the movement thereof along said longitudinal axis;

said control piston having a first portion movably guided in and engaging a radially facing wall of an axial bore in said valve piston and a second portion extending outside said axial bore and engaging said housing wall; and said metering edge is adjacent a junction of said first and second portions.

26. A proportional throttle valve according to claim 15 wherein said metering edge extends radially on said control piston relative to said longitudinal axis adjacent said fluid outlet.

* * * * *